Patented Apr. 10, 1945

2,373,152

UNITED STATES PATENT OFFICE 2,373,152

DIFURYL SULPHONATES

Jack T. Thurston, Riverside, Conn., assignor to American Cyanamid Company, New York, N. Y., a corporation of Maine No Drawing. Application August 1, 1942, Serial No. 453,278

3 Claims. (Cl. 260—345)

This invention relates to certain new and useful compounds and to their preparation. More particularly my invention relates to difuryl substituted organic sulphonates.

An object of this invention is to provide sulphonates which contain two furyl groups as substituents.

Another object of this invention is to provide difuryl substituted organic disulphonates.

Still another object of my invention is to provide organic sulphonates suitable for the preparation of resins having cation active properties.

A further object of my invention is to provide processes for preparing sulphonates of the aforementioned type.

The compounds which form the subject of this invention have the following general formula:

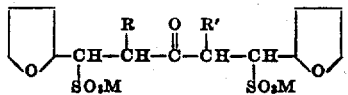

and where M is a metal, or hydrogen, or

where R, R', $R_2$, $R_3$, and $R_4$ are hydrogen or organic radicals. R and R' may be part of a ring structure. The "R" groups may be any desired organic radical since they are not the essential characteristics of my new compounds. The term "sulphonate" as used herein is intended to cover the hydrogen sulphonate as well as the metal, ammonia, or amine salts thereof.

The sulphonates described above may be prepared by treating a compound of the formula:

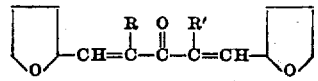

where R and R' are the same as above with a bisulphite or with sulphur dioxide, preferably in a suitable medium such as water. Compounds of the formula:

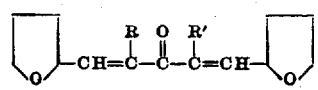

may be prepared by condensing furfural with a ketone containing active methyl or active methylene groups.

The following examples, in which the proportions are in part by weight, except as otherwise indicated, are given by way of illustration and not in limitation.

EXAMPLE 1

*Preparation of disodium 1,5-di-alpha-furyl-3-ketopentane disulphonate-1,-5*

| | Parts |
|---|---|
| Difurfurylidene acetone | 86 |
| Sodium bisulphite | 83 |
| Water | 118 |

These substances are heated to boiling and refluxed in a suitable apparatus for about 16 hours. The resulting solution is treated with decolorizing charcoal and filtered. The product is precipitated from the filtrate by addition of the ethanol. A yield of about 84% is obtained. The product does not melt at temperatures up to about 250° C.

EXAMPLE 2

*Preparation of 2,6-bis-(alpha-furyl-potassium-sulphomethyl)-cyclohexanone*

| | Parts |
|---|---|
| Difurfurylidene-cyclohexanone (0.54 mol) | 137 |
| Potassium metabisulphite (0.54 mol) | 120 |
| Water | 280 |
| The monoethyl ether of ethylene glycol | 325 |

The difurfurylidene-cyclohexanone is prepared in accordance with the procedures outlined in Compt. rend. 174, 1469, (1923) and J. Pharm. Chim. 6, 204, (1927). The potassium metabisulphite is dissolved in the water to form a solution which is added to a suspension of the difurfurylidene-cyclohexane in the monoethyl ether of ethylene glycol. The mixture is heated to boiling and refluxed for about 2½ hours. After about ½ hour of refluxing, the white solid begins to separate. At the conclusion of the refluxing operation the reaction mixture is cooled thereby causing a large mass of crystals to separate. The solid material is filtered, suspended in the monoethylene ether of ethylene glycol, filtered, washed with an additional quantity of said ether, washed with acetone and dried. An additional quantity of the product may be obtained by adding about 2 volumes of acetone to the ether filtrate thereby precipitating crystals which are filtered, washed and dried. The combined yield of the product is about 91% of the theoretical and it melts at about 250° C. The product shows the following analysis:

| | Per cent C | Per cent H | Per cent S |
|---|---|---|---|
| Calculated for $C_{16}H_{16}O_9S_2K_2$ | 38.69 | 3.24 | 12.96 |
| Obtained | 38.69 | 3.35 | 13.15 |
| | 38.61 | 3.34 | 13.07 |

Example 3

*Preparation of furfurylidene-methyl-α-furfurylidene-ethyl ketone*

| | Parts |
|---|---|
| Methyl ethyl ketone (5 mols) | 360 |
| Sodium hydroxide (2.2 mols) | 86.5 |
| Alcohol | 1,000 |
| Furfural (11 mols) | 1,110 |

A mixture of the ketone and a solution of the sodium hydroxide in the water is placed in a reaction vessel provided with a mechanical agitator. The alcohol is added to give a clear solution after which the furfural is added slowly over a period of about 1 hour. During the addition of the furfural, the temperature rises to about 62° C. and the color becomes dark. The reacting mixture is agitated for about 5 hours and then permitted to stand for about 16 hours after which time the product has crystallized as a dark mass of solid material. This mass of material is broken up and washed with cold methanol. After drying the crystals a yield of about 65% of the theoretical is obtained. The crystals are light yellow having a melting point of 60–61° C. and after crystallization from aqueous alcohol show the following analysis:

| | Per cent C | Per cent H |
|---|---|---|
| Calculated for $C_{14}H_{12}O_3$ | 73.68 | 5.26 |
| Obtained | 72.87 | 5.12 |
| | 72.65 | 4.99 |

Example 4

*Preparation of furfuryl-methyl furfuryl-ethyl ketone disulphonate*

| | Parts |
|---|---|
| Furfurylidene - methyl furfurylidene - ethyl ketone (2 mols) | 461 |
| Potassium metabisulphite (2 mols) | 449 |
| Water | 800 |

A mixture of these substances is refluxed in a suitable reaction vessel for about 1 hour and then maintained at approximately 85° C. for approximately 16 hours. A white crystalline solid deposits on cooling. The solid material is filtered and washed with acetone. The filtrate is poured into twice its volume of ethanol, thereby precipitating an additional quantity of the crystalline material. This material is washed with acetone and combined with the other crystals and dried at about 120° C. A yield of about 83% of the theoretical is obtained. The product does not melt at temperatures up to about 200° C.

In order to obtain the sulphonates contemplated by my invention it is apparent from the foregoing examples that a total of 2 mols furfural react with 1 mol of a ketone having two active groups either methyl or methylene, and the resulting compound in turn may be reacted with 1 or 2 mols of a bisulfite or sulphurous acid. It may be desirable to employ an excess of the bisulfite or of the furfurylidene ketone in order to drive the reaction to completion.

Other ketones having active methyl or active methylene groups may be reacted with furfural and converted to the sulfonate in accordance with the foregoing disclosure. Thus, for example other ketones such as methyl hexyl ketone, di-n-butyl ketone, methyl-n-propyl ketone, methyl-n-butyl ketone, methyl cyclohexanone, cyclopentanone, etc., may be used. Compounds having the general formula:

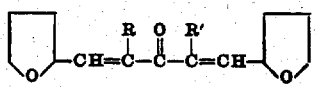

may be converted to the corresponding sulphonate by treatment with a bisulphite or with sulphur dioxide in a suitable medium such as water. Examples of suitable bisulphites include sodium bisulphite, potassium bisulphite, ammonium bisulphite or other desirable metal bisulphites such as calcium bisulphite. In general, the alkali metal bisulphites are preferred. The hydrogen sulphonate may be converted into the corresponding metal, ammonium or amine salts if desired. Examples of amines for such salts are: methyl amine, dimethyl amine, triethyl amine, pyridine, the mono-, di and tri-ethanolamines, etc. Another method of producing sulphonates is by treatment of the furfurylidene compounds with a hydrogen halide followed by treatment with sodium sulphite or with other alkali metal sulphites. Thus, for example, hydrogen chloride may be added to furfurylidene acetone and the resulting material treated with sodium sulphite. Still another type of sulphonate may be prepared by the condensation of furfural with a halogen submitted ketone such as chloroacetone followed by treatment (1) with a hydrogen halide and then with a sulphite or (2) with a mixture of a bisulphite and a sulphite preferably in a molar ratio of about 2:1. The bisulphite or sulphite may be a salt of an alkali metal, ammonia, or any other desired metal or amine.

The sulphonates may be prepared from the furfurylidene compounds by reaction with bisulphites at temperatures ranging upwards from room temperature. In most instances the reaction is advantageously carried out at a temperature between about 70° C. and about 130° C., although temperatures as low as room temperature may be employed. If sulphur dioxide be used the reaction is preferably carried out under pressure, e. g., 25–100 pounds per square inch and/or at relatively low temperatures such as about 20° C. The time of reaction varies somewhat according to the compatibility of the reactants. Thus, if a homogeneous solution of the reactants be employed, the reaction will usually be completed in from about ½ hour to about 2 hours. On the other hand, if the solution of the reactants is not homogeneous 6–8 hours or even more may be required. Generally water is employed as the solvent medium for the bisulphite and furfurylidene compound, but if sufficient solubility is not obtained other solvents may be used. Mixtures of water and water miscible organic solvents are especially suitable since the water is a good solvent for the sulphite while the organic solvent is a good solvent for the furfurylidene compound. Examples of suitable solvents are: methanol, ethanol, propanol, isopropanol, butanol, dioxane, the lower alkyl monoethers of ethylene glycol and diethylene glycol, such as the monoethyl ether of ethylene glycol, the monobutyl ether of diethylene glycol, etc. Furthermore, inert ketones may be used as solvents in the production of sulphonates. In some instances it may be desirable to employ active ketones as intermediates in the preparation of sulphonates. Thus the bisulphite may be added to an active ketone and this in turn react with the furfurylidene compounds, the former giving up the bisulphite to the latter.

My furyl substituted sulphonic acids are especially suitable for resinification with an aldehyde to produce resinous materials having cation active properties. They are also useful in the preparation of emulsifiers, wetting agents, dispersing agents and as intermediates in the synthesis of many organic compounds.

Obviously many modifications and variations in the processes and compositions described above may be made without departing from the spirit and scope of the invention as defined in the appended claims.

I claim:
1. A di-alpha-furyl ketone disulphonate.
2. 1,5-di-alpha-furyl-3-ketopentane disulphonate-1,5.
3. A 2,6-bis(alpha-furyl metal sulphomethyl)-cyclohexanone.

JACK T. THURSTON.

CERTIFICATE OF CORRECTION.

Patent No. 2,373,152. April 10, 1945.

JACK T. THURSTON.

It is hereby certified that error appears in the printed specification of the above numbered patent requiring correction as follows: Page 2, second column, line 30, for the word "submitted" read --substituted--; page 3, first column, line 7, after "many" insert --other--; and that the said Letters Patent should be read with this correction therein that the same may conform to the record of the case in the Patent Office.

Signed and sealed this 26th day of June, A. D. 1945.

Leslie Frazer
(Seal) Acting Commissioner of Patents.

My furyl substituted sulphonic acids are especially suitable for resinification with an aldehyde to produce resinous materials having cation active properties. They are also useful in the preparation of emulsifiers, wetting agents, dispersing agents and as intermediates in the synthesis of many organic compounds.

Obviously many modifications and variations in the processes and compositions described above may be made without departing from the spirit and scope of the invention as defined in the appended claims.

I claim:
1. A di-alpha-furyl ketone disulphonate.
2. 1,5-di-alpha-furyl-3-ketopentane disulphonate-1,5.
3. A 2,6-bis(alpha-furyl metal sulphomethyl)-cyclohexanone.

JACK T. THURSTON.

CERTIFICATE OF CORRECTION.

Patent No. 2,373,152. April 10, 1945.

JACK T. THURSTON.

It is hereby certified that error appears in the printed specification of the above numbered patent requiring correction as follows: Page 2, second column, line 30, for the word "submitted" read --substituted--; page 3, first column, line 7, after "many" insert --other--; and that the said Letters Patent should be read with this correction therein that the same may conform to the record of the case in the Patent Office.

Signed and sealed this 26th day of June, A. D. 1945.

Leslie Frazer
(Seal) Acting Commissioner of Patents.